United States Patent
Lappan et al.

(10) Patent No.: US 9,803,772 B2
(45) Date of Patent: Oct. 31, 2017

(54) VALVE DEVICE FOR A HYDRAULIC CIRCUIT AND OIL PUMP CONTROL APPARATUS

(71) Applicant: PIERBURG GMBH, Neuss (DE)

(72) Inventors: Rolf Lappan, Cologne (DE); Lukas Romanowski, Osnabrueck (DE); Christoph Sadowski, Sprockhoevel (DE)

(73) Assignee: PIERBURG GMBH, Neuss (DE)

( * ) Notice: Subject to any disclaimer, the term of this patent is extended or adjusted under 35 U.S.C. 154(b) by 81 days.

(21) Appl. No.: 14/764,576

(22) PCT Filed: Jan. 10, 2014

(86) PCT No.: PCT/EP2014/050389
§ 371 (c)(1),
(2) Date: Jul. 30, 2015

(87) PCT Pub. No.: WO2014/117989
PCT Pub. Date: Aug. 7, 2014

(65) Prior Publication Data
US 2015/0377376 A1    Dec. 31, 2015

(30) Foreign Application Priority Data
Feb. 1, 2013   (DE) .......................... 10 2013 101 038

(51) Int. Cl.
*F16K 31/06*    (2006.01)
*F16K 15/18*    (2006.01)

(52) U.S. Cl.
CPC .............. *F16K 31/06* (2013.01); *F16K 15/18* (2013.01); *F16K 31/0634* (2013.01); *F16K 31/0693* (2013.01)

(58) Field of Classification Search
CPC ...... F16K 15/18; F16K 31/06; F16K 31/0634; F16K 31/0693; F16K 31/0658;
(Continued)

(56) References Cited

U.S. PATENT DOCUMENTS 7,458,395 B2 * 12/2008 Haynes ............... F16K 31/0606
137/625.65
2004/0090296 A1    5/2004 Ojima et al.
(Continued)

FOREIGN PATENT DOCUMENTS

DE            103 30 779 A1    5/2004
DE    10 2005 034 938 A1    2/2007
(Continued)

*Primary Examiner* — Kevin Murphy
*Assistant Examiner* — Kelsey Rohman
(74) *Attorney, Agent, or Firm* — Norman B. Thot

(57) ABSTRACT

A valve device for a hydraulic circuit includes an actuator unit comprising an electromagnetic circuit which comprises an armature, a core, a coil carrier, a coil, and a flux guiding device. A valve unit comprises a unit formed by a valve tappet and the armature, inlet and outlet ports, and a control port arranged between the inlet and outlet ports. A longitudinal through bore is arranged in the unit to extend from the inlet port into an actuator chamber. A first control body cooperating with a first valve seat and a second control body cooperating with a second valve seat are arranged at the unit in which the longitudinal through bore is formed. The armature and the valve tappet are loaded in an opening direction of the inlet valve by a spring element and are loadable in an opening direction of the outlet port by energizing the electromagnetic circuit.

10 Claims, 1 Drawing Sheet

(58) Field of Classification Search
CPC .. F16K 31/0668; F16K 31/0675; F16K 1/443; F01M 1/16; F04C 14/24; Y10T 137/86622; Y10T 137/86702; Y10T 137/8667; Y10T 137/86686; Y10T 137/86694
USPC ............ 137/625.65, 625.68, 625.25, 625.27, 137/625.67; 251/50, 129.07, 129.18, 251/129.15
See application file for complete search history.

(56) References Cited

U.S. PATENT DOCUMENTS

| | | | |
|---|---|---|---|
| 2006/0027773 A1* | 2/2006 | Nordstrom | F01L 1/34 251/129.15 |
| 2007/0284008 A1* | 12/2007 | Brower | F16K 31/0624 137/625.25 |
| 2008/0196777 A1 | 8/2008 | Ross et al. | |
| 2010/0139611 A1 | 6/2010 | Hunter | |
| 2011/0226975 A1* | 9/2011 | Buse | F16K 1/36 251/129.15 |
| 2013/0099144 A1 | 4/2013 | Buse et al. | |

FOREIGN PATENT DOCUMENTS

| | | |
|---|---|---|
| DE | 11 2008 000 978 T5 | 6/2010 |
| DE | 10 2010 025 171 A1 | 12/2011 |
| FR | 2 383 372 A1 | 10/1978 |
| FR | 2 422 885 A1 | 11/1979 |

* cited by examiner

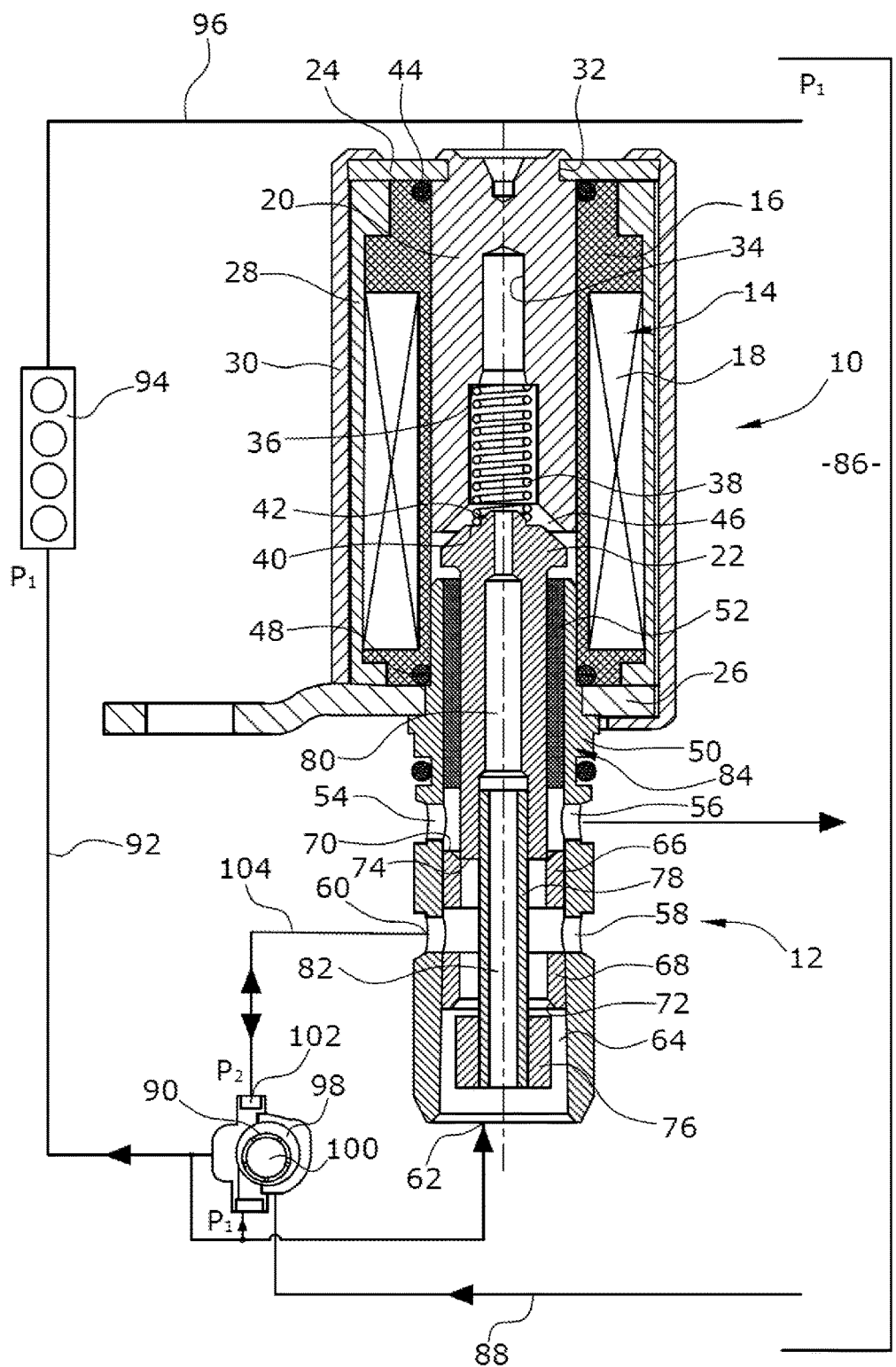

VALVE DEVICE FOR A HYDRAULIC CIRCUIT AND OIL PUMP CONTROL APPARATUS

CROSS REFERENCE TO PRIOR APPLICATIONS

This application is a U.S. National Phase application under 35 U.S.C. §371 of International Application No. PCT/EP2014/050389, filed on Jan. 10, 2014 and which claims benefit to German Patent Application No. 10 2013 101 038.5, filed on Feb. 1, 2013. The International Application was published in German on Aug. 7, 2014 as WO 2014/117989 A1 under PCT Article 21(2).

FIELD

The present invention relates to a valve device for a hydraulic circuit with an actuator unit having an electromagnetic circuit formed by a translationally movable armature, a core, an energizable coil arranged on a coil carrier, and flux guiding device, a valve unit with a valve tappet forming a unit with the armature, an outlet port, an inlet port spaced further from the armature unit than the outlet port, and a control port arranged between the inlet port and the outlet port, a first control body cooperating with a first valve seat formed between the control port and the outlet port, and a second control body cooperating with a second valve seat formed between the control port and the inlet port, wherein the armature and the valve tappet are loaded in the opening direction of the inlet port by a spring element and may be loaded in the opening direction of the outlet port by energizing the electromagnetic circuit.

BACKGROUND

Such valve devices are used to control the pressure of hydraulic actuators, for example, in control systems for automatic transmissions, or to control the pressure in an actuator chamber of a variable oil pump of an oil circuit for the lubrication of an internal combustion engine of a motor vehicle. A ring of a feed chamber, on which the rotor of a vane pump or a gear pump runs, is here shifted or twisted via the pressure in the control chamber, whereby the displacement volume is changed.

The pressure control valves used for these purposes are designed as multi-port valves, for example, by which the pump control chamber can either be relieved via the oil sump or be charged with additional pressure from the feed pressure of the oil pump.

Such a system for controlling the pressure in two control chambers of an oil pump using a solenoid valve is described, for example, in DE 11 2008 000 978 T5. The differential pressure between the two control chambers is here changed as a function of the feed pressure and the position of the valve tappet of the solenoid valve.

A multi-port solenoid valve is described in DE 103 30 779 A1 which comprises an electromagnetically actuable valve member controlling a flow cross section between a control port and an outlet by translational movement of an armature of the solenoid that is connected with the valve member and is loaded by a spring element. The valve also has a spring-loaded ball as a second closing member between an inlet port and the control port so that the control port can be supplied with pressure from the inlet port due to the fact that a protrusion of the valve member, which extends towards the ball, pushes the ball from its valve seat due to the force of the spring element between the armature and the core. The armature is pulled by actuating the solenoid, and the valve element is thereby pulled towards the armature, whereby the passage from the control port to the outlet port is cleared, and the ball closes the connection of the control port to the inlet port.

DE 10 2010 025 171 A1 describes a fluid pressure switching valve which also comprises an outlet port closer to the actuator and an inlet port remote from the actuator, as well as a control port of a variable oil pump arranged between the inlet port and the outlet port. This valve is not pressure compensated, however, since, while a fluidic connection between the inlet port and an actuator chamber between the armature and the core may be formed by a bore in the armature and in the valve tappet, the force application surfaces are realized with different dimensions. In this valve, the connection between the inlet port and the control port is moreover interrupted in the non-energized state. This means that the oil pump must be designed so that, when the control pressure rises, a decrease in the displacement volume of the pump must follow so as to be able to ensure a sufficient lubrication of an internal combustion engine in the event of a dysfunctional solenoid.

Both valves thus have a drawback in that, due to the absence of pressure compensation, they are dependent on the magnitude of the prevailing feed pressure for the necessary armature opening force. The return spring and the solenoid must thus be adapted to existing forces. Known solenoid valves therefore require very great actuating forces when used in other pressure ranges so that other solenoids must be used.

SUMMARY

An aspect of the present invention is to provide a valve device, as well as an oil pump control arrangement comprising such a valve device, wherein the actuator of the valve device is adapted for use at different pressure levels, and wherein, in the event of a failure of the actuator, a sufficient oil supply to the internal combustion engine is provided in the case that, with the control pressure at the control pressure port of the solenoid valve rising, the pump also increases its output. An aspect of the present invention is also to provide a valve device which can be manufactured as economically as possible.

In an embodiment, the present invention provides a valve device for a hydraulic circuit which includes an actuator unit, a valve unit, a first control body, a second control body, an actuator chamber, and a longitudinal through bore. The actuator unit comprises an electromagnetic circuit which comprises an armature configured to be translationally movable, a core, a coil carrier, a coil configured to be energizable and which is arranged on the coil carrier, and a flux guiding device. The valve unit comprises a unit formed by a valve tappet and the armature, an outlet port, an inlet port arranged so as to be spaced further from the actuator unit than the outlet port, and a control port arranged between the inlet port and the outlet port. The first control body is configured to cooperate with a first valve seat formed between the control port and the outlet port. The second control body is configured to cooperate with a second valve seat formed between the control port and the inlet port. The actuator chamber is formed between the core and the armature. The longitudinal through bore is configured to extend axially and is arranged in the unit to extend from the inlet port into the actuator chamber. The armature and the valve tappet are loaded in an opening direction of the inlet valve by a spring element and are loadable in an opening direction of the outlet port by energizing the electromagnetic circuit. The first control body and the second control body are arranged at the unit in which the longitudinal through bore is formed.

BRIEF DESCRIPTION OF THE DRAWINGS

The present invention is described in greater detail below on the basis of embodiments and of the drawing in which:

FIG. 1 shows is a side elevational view of a valve device of the present invention in sectional view in which the connection with an oil circuit of an internal combustion engine is shown schematically.

DETAILED DESCRIPTION

Due to the fact that the first and the second control body are arranged at the unit formed by the armature and the valve tappet, in which an axial through bore is formed which extends from the inlet port into an actuator chamber provided between the core and the armature, the arrangement of the inlet port at the end of the valve device opposite the actuator provides a connection between the inlet port and the control port in a non-energized state, thereby setting a maximum output of a conventionally used variable oil pump, wherein the feed pressure rises as the control pressure rises. It is here possible to use a standard coil with low forces for different applications since the pressure prevailing in the actuator chamber between the armature and the core is always the same as on the opposite side of the unit of valve tappet and armature. A pressure compensated valve device is thereby provided.

When this valve is used as a control valve in an oil circuit of an internal combustion engine, the control port is connected with the control chamber of the oil pump, the outlet port is connected with the oil sump, and the inlet port is loaded with the feed pressure of the oil pump. This arrangement makes it possible to fully control the pressure of the oil circuit, wherein a sufficient oil supply of the internal combustion engine is provided even in the event of a failure of the solenoid or of the power supply to the solenoid.

In an embodiment of the present invention, the force application surface at the second control body, on which the hydraulic pressure at the inlet port acts, can, for example, be equal to the force application surface at the armature, on which the hydraulic pressure in the actuator chamber between the armature and the core acts. With respect to the hydraulic forces occurring, an equilibrium of forces is achieved on both sides of the mobile unit of the armature and the valve tappet in any state of the valve device. The solenoid force thus merely depends on the force of the spring element.

In an embodiment of the present invention, the diameter of the first control body can, for example, correspond to the diameter of the first control body, whereby an equilibrium of forces is also obtained, on either side of the control port, at the armature/valve tappet unit at both control bodies acting as the pressure application surfaces.

In an embodiment of the present invention, the first control body can, for example, be formed by an axial end of the armature. No additional control body must thus be mounted to or formed at the valve tappet. Manufacturing costs are thereby reduced and assembly is facilitated.

In an embodiment of the present invention, the valve tappet can, for example, be pressed into a bore in the armature and the second control body can, for example, be fastened to the valve tappet. This connection is simple and economical to realize, in particular since the manufacture of the through bore is simplified by the two-part design of the armature/valve tappet unit.

In an embodiment of the present invention, a central protrusion can, for example, extend from a bearing surface of the armature towards the core, which protrusion is surrounded by the spring element that is supported on the bearing surface. It is thereby possible to guide the spring without further parts so that a kinking or slipping of the spring from the bearing surface is prevented.

The distances between the components of the armature/valve tappet unit, as well as the length thereof are, for example, chosen so that, when the second control body rests on the second valve seat, a gap exists between the armature and the core. The armature is thereby prevented from sticking on the core which would otherwise lead to a greater necessary spring force and thus to greater necessary electromagnetic forces.

In an embodiment of the present invention, the valve unit can, for example, comprise a flow housing in which the control port and the outlet port are formed as transversal bores and the inlet port is formed as a longitudinal bore at an axial end of the flow housing. Such a flow housing is simple and economical to manufacture and to assemble.

In a further development thereof, the flow housing of the valve unit can, for example, comprise a section that is partially surrounded radially by the coil carrier and in which a bearing bush is mounted. The assembly of the bearing bush is thereby simplified, it being possible to introduce the bearing bush into the valve unit prior to joining the valve unit and the actuator unit. Only a small number of components is further required.

In an embodiment of the present invention, a sealing ring can, for example, be provided between the coil carrier and the core at a first axial end of the coil carrier, and, at the opposite axial end of the coil carrier, a sealing ring can be arranged between the coil carrier and the flow housing of the valve unit. It is thereby provided that no oil can escape from the actuator chamber into the ambient environment.

A valve device is thus provided that is simple to manufacture and to assemble and which is adapted for use as a pressure control valve in an oil circuit of oil pumps that increase their output with the increase in oil pressure, since a sufficient oil supply to an internal combustion engine is provided even in the event of a failure of the actuator unit. It is thereby possible to use a standard coil with low necessary magnetic forces for different pressure levels since the armature/valve tappet unit is balanced with respect to the hydraulic forces. A control of an oil pump can accordingly be made with a quick adaptation of the amount of oil to be delivered.

An embodiment of a valve device of the present invention and of the associated oil pump control arrangement is shown in the drawing and will be described hereinafter.

The present valve device illustrated in FIG. 1 comprises an actuator unit 10 to which a valve unit 12 is fastened. The actuator unit 10 includes an electromagnetic circuit 14 formed by a coil 18 wound on a coil carrier 16, a core 20 on the radial inner side of the coil carrier 16, a translationally movable armature 22 and flux guiding device completing the electromagnetic circuit 14. The flux guiding device is two magnetic feedback sheets 24, 26 arranged at the axial ends of the coil 18, the two magnetic feedback sheets 24, 26 are conductively connected with a yoke 30 surrounding the coil 18 on the outer side. The coil 18 is enclosed by a plastic sleeve 28 which also includes a plug element (not illustrated herein) for supplying electrical power to the coil 18.

At its end averted from the valve unit 12, the core 20 mounted in the coil carrier 16 has a continuous recess 32 in the outer circumference, into which the magnetic feedback sheet 24 circumferentially extends for fixation. At the opposite axial end, an axially extending, central, stepped blind bore 34 is formed in the core 20, which blind bore 34 is open to the valve unit 12 and has a diameter increasing in the direction of the valve unit 12. The blind bore 34 is correspondingly formed with a shoulder 36 on which a spring element 38 rests, the opposite axial end of the spring element 38 resting under pre-tension on a bearing surface 40 of the armature 22 on which a protrusion 42 is formed that extends axially towards the blind bore 34. The spring element 38 surrounds the protrusion 42 radially so that the spring element 38 is prevented from slipping off the bearing surface 40. The spring element 38 is guided by the blind bore 34 whose side walls radially surround the spring element 38.

When the coil 18 is energized, a magnetic force of attraction is generated between the armature 22 and the core 20, which force counteracts the spring force. The surfaces of the armature 22 and of the core 20 facing each other are each beveled in a frustoconical manner so as to correspond to each other.

Immediately adjoining the magnetic feedback sheet 24, a first sealing ring 44 is arranged between the core 20 and the coil carrier 16, by which first sealing ring 44 oil is prevented from flowing to the outside along the outer circumference of the core 20 from an actuator chamber 46 formed between the armature 22 and the core 20 inside the coil carrier 16.

Immediately adjoining the magnetic feedback sheet 26, a second sealing ring 48 is arranged on the axially opposite side of the actuator unit 10 between the coil carrier 16 and a flow housing 50 of the valve unit 12, by which second sealing ring 48 oil is prevented from flowing to the outside along the outer circumference of the flow housing 50 from the actuator chamber 46 so that the actuator chamber 46 is completely sealed off with respect to the environment.

The armature 22 is guided in a slide bush 52 arranged radially inside the flow housing 50 that extends into the coil carrier 16 and through an opening in the feedback sheet 26. The slide bush 52 extends from a first axial end of the flow housing 50 to before a first transverse bore 54 in the flow housing 50 that serves as an outlet port 56. In the region further from the actuator unit 10, the flow housing 50 has another second transverse bore 58 serving as a control port 60. An inlet port 62 is formed by the open axial end of a longitudinal through bore 64 of the flow housing 50, which end is averted from the actuator unit 10.

Two valve seats 66, 68 with frustoconical seat surfaces 70, 72 are formed in the longitudinal through bore 64 of the flow housing 50. The first valve seat 66 is located between the control port 60 and the outlet port 56. The seat surface 70 is directed towards the outlet port 56. The second valve seat 68 is located between the inlet port 62 and the control port 60, the seat surface 72 thereof being directed towards the inlet port 62.

The first valve seat 66 cooperates with an axial end of the armature 22 facing away from the actuator unit 10 so that this end of the armature 22 serves as the first control body 74 which has a seat surface that is not inclined so that, when the first control body 74 rests on the first valve seat 66, a connection between the outlet port 56 and the control port 60 is interrupted by the linear contact between the first control body 74 and the seat surface 70.

The second valve seat 68 is controlled by a second control body 76 fastened on an end of a valve tappet 78 that forms a unit 84 together with the armature 22 and whose opposite end is pressed into a longitudinal through bore 80 in the armature 22 so that the valve tappet 78 is moved with the armature 22. The second control body 76 also has a seat surface that is not inclined and forms a line contact with the seat surface 72 of the second valve seat 68 when the second control body 76 rests thereon, the contact interrupting a connection between the inlet port 62 and the control port 60.

The valve tappet 78, similar to the armature 22, also has a longitudinal through bore 82 opening into the longitudinal through bore 80 of the armature 22 so that a continuous fluid communication exists between the inlet port 62 to the actuator chamber 46. Pressure compensation accordingly exists between the inlet port 62 and the actuator chamber 46. This pressure acts on the movable parts of the valve device. The force application surface here is as large as the force application surface of the armature 22 effective in the actuator chamber 46. An equilibrium of forces thus exists with respect to the effective hydraulic forces at the opposite ends of the unit 84. Even the pressure at the control port 60 causes no imbalance of the hydraulic forces acting on the unit 84, since the opposing force application surfaces of the first control body 74 and the second control body 76 are also of equal magnitude.

The functioning of this valve device as an oil pump control device will be explained hereinafter with reference to the oil circuit of an internal combustion engine.

The oil circuit is formed by an oil sump 86 from which a variable oil pump 90 draws oil via a suction line 88. The oil flows through a supply line 92 to an internal combustion engine 94 for lubrication purposes, and flows back from there to the oil sump 86 via a return line 96.

As mentioned above, the pump is a variable oil pump 90 in which the output and thus the feed pressure $p_1$ is set by adjusting an eccentric ring 98 in which a pump rotor 100 is rotated for the purpose of delivery.

The adjustment of the eccentric ring 98 is effected by controlling a control pressure in a control chamber 102 of the variable oil pump 90. The control pressure acting in the control chamber 102 is controlled by the valve device of the present invention by connecting the control port 60 of the valve device with the control chamber 102 via a control line 104 so that the control pressure prevailing at the control port 60 and in the control chamber 102 is always the same. The feed pressure of the variable oil pump 90 acts on the opposite side of the eccentric ring 98. The outlet port 56 of the valve device serves as the outlet to the oil sump 86. The inlet port 62 is connected with a feed line of the variable oil pump 90.

In the non-energized state of the valve device illustrated in FIG. 1, the armature 22 is pressed on the first valve seat 66 by the pressing force of the spring element 38. In this state, fluid communication between the outlet port 56 and the control port 60 is closed, while the second control body 76 is spaced from the second valve seat 68 so that fluid communication between the inlet port 62 and the control port 60, and thus the control chamber 102, is cleared, whereby oil under the feed pressure $p_1$ reaches the control chamber 102. This results in an increased pressure in the control chamber 102 and thus in an increased feed pressure of the variable oil pump 90, since the eccentric ring 98 is displaced ever farther in the direction of maximum feed pressure.

In order to reduce this feed pressure, e.g., when low engine powers are required, the electromagnetic circuit 14 is activated by energizing the coil 18. The electromagnetic force generated acts against the spring force so that the armature 22 with the valve tappet 78 is moved towards the actuator unit 10 until the second control body 76 rests on the second valve seat 68 and the first control body 74 is lifted from the first valve seat 66. In this state, a gap remains in the actuator chamber 46 between the armature 22 and the core 20. Due to the movement described, the fluid communication from the inlet port 62 to the control port 60 is interrupted and, at the same time, fluidic communication between the control port 60 and the outlet port 56, and thus to the oil sump 86, is cleared. As a consequence, oil can flow from the control chamber 102 to the oil chamber, whereby the eccentricity of the eccentric ring 98 is reduced and, thereby, the output of the variable oil pump 90 is reduced. When the engine control requires higher pressure, current in the coil 18 is reduced again so that the magnetic force decreases and the spring force exceeds the hydraulic force and the magnetic force.

Intermediate positions which cause a partial clearing of both fluid communication paths are of course also possible, whereby an equilibrium of oil flowing into and out from the control chamber can be obtained.

It follows therefrom that the current supply must be provided substantially inversely proportional to the oil pressure required. Owing to the longitudinal through bores 80, 82 and the resulting pressure compensation between the inlet port 62 and the actuator chamber 46, no varying additional forces act on the unit 84. It is thereby possible to use the same actuator unit 10 for different required maximum pressures in different engines. In the event of a failure of the actuator unit, the maximum oil amount is required so that damage to the engine can be reliably prevented which would otherwise be caused by insufficient supply of oil to the engine due to a dysfunctional actuator. The valve device is of a simple structure and is easy to assemble. It at the same time allows for a quick and good controllability of the oil amounts required.

It should be clear that these valve devices are also suitable for other hydraulic circuits. Structural modifications to the valve device with respect to the embodiment illustrated, such as an integral design of armature, valve tappet and control body, as well as a different division of the housings and the like, are also conceivable without leaving the scope of protection of the main claim. Reference should also be had to the appended claims.

What is claimed is:

1. A valve device for a hydraulic circuit, the valve device comprising:
    an actuator unit comprising an electromagnetic circuit comprising,
        an armature configured to be translationally movable,
        a core,
        a coil carrier,
        a coil configured to be energizable and which is arranged on the coil carrier, and
        a flux guiding device;
    a valve unit comprising,
        a unit formed by a valve tappet and the armature,
        an outlet port,
        an inlet port arranged so as to be spaced further from the actuator unit than the outlet port, and
        a control port arranged between the inlet port and the outlet port;
    a first control body configured to cooperate with a first valve seat formed between the control port and the outlet port;
    a second control body configured to cooperate with a second valve seat formed between the control port and the inlet port;
    a spring element;
    an actuator chamber formed between the core and the armature; and
    a longitudinal through bore configured to extend axially, the longitudinal through bore being arranged in the unit to extend from the inlet port into the actuator chamber, wherein,
    the armature and the valve tappet are loaded in an opening direction of the inlet port by the spring element and are loadable in an opening direction of the outlet port by energizing the electromagnetic circuit,
    the first control body and the second control body are arranged at the unit in which the longitudinal through bore is formed,
    the second control body comprises a force application surface on which a hydraulic pressure at the inlet port acts,
    the armature comprises a force application surface on which a hydraulic pressure in the actuator chamber acts,
    the force application surface of the second control body is always equal to the force application surface of the armature so that an equilibrium of forces is achieved on each side of the unit formed by the valve tappet and the armature in any state of the valve device.

2. The valve device as recited in claim 1, wherein,
    the first control body comprises a diameter,
    the second control body comprises a diameter, and
    the diameter of the first control body corresponds to the diameter of the second control body.

3. The valve device as recited in claim 1, wherein the armature comprise an axial end, and the first control body is formed by the axial end of the armature.

4. The valve device as recited in claim 1, wherein,
    the armature comprises an armature longitudinal through bore,
    the valve tappet is pressed into the armature longitudinal through bore, and
    the second control body is fastened to the valve tappet.

5. The valve device as recited in claim 1, wherein the armature comprises a bearing surface and a central protrusion, the bearing surface being configured to support the spring element, and the central protrusion being configured to extend from the bearing surface towards the core and to be surrounded by the spring element.

6. The valve device as recited in claim 1, wherein, when the second control body rests on the second valve seat, a first gap exists between the armature and the core.

7. The valve device as recited in claim 1, wherein,
    the valve unit further comprises a flow housing comprising an axial end, the flow housing being configured to have the control port and the outlet port be formed therein as transversal bores, and
    the inlet port is formed as a longitudinal bore at the axial end of the flow housing.

8. The valve device as recited in claim 7, further comprising:
    a bearing bush,
    wherein, the flow housing comprises a section that is partly surrounded by the coil carrier and in which the bearing bush is fastened.

9. The valve device as recited in claim 1, further comprising:
    a first sealing ring arranged at a first axial end of the coil carrier between the coil carrier and the core; and a second sealing ring arranged between the coil carrier and the flow housing of the valve unit at an opposite axial end of the coil carrier.

10. An oil pump control arrangement comprising:

the valve device as recited in claim 1; and a variable oil pump comprising a control chamber and an oil sump, wherein, the control port is in a fluid communication with the control chamber, the outlet port is in a fluid communication with the oil sump, and a feed pressure of the oil pump prevails at the inlet port.

* * * * *